Aug. 2, 1927.

H. C. BIERMAN 1,637,331

MOLDED GEAR

Filed Aug. 25, 1923

WITNESSES:
R. J. Butler.
M. B. Jaspert

INVENTOR
Harry C. Bierman
BY
Wesley G. Carr
ATTORNEY

Patented Aug. 2, 1927.

1,637,331

UNITED STATES PATENT OFFICE.

HARRY C. BIERMAN, OF WILKINSBURG, PENNSYLVANIA, ASSIGNOR TO WESTINGHOUSE ELECTRIC & MANUFACTURING COMPANY, A CORPORATION OF PENNSYLVANIA.

MOLDED GEAR.

Application filed August 25, 1923. Serial No. 659,271.

My invention relates to composite articles, more especially to composite gear wheels comprising a metal center or hub having a nonmetallic rim member of fibrous material consolidated with a phenolic condensation product thereon.

It is among the objects of my invention to provide a composite article of the above designated character which shall be of simple construction, which shall be of uniform density throughout its nonmetallic rim portion, which shall be adapted to manufacture in production quantities and which shall be mechanically durable and efficient as a gear element when employed in machine tools, engines or the like.

Various means of forming composite gear wheel structures which have been heretofore employed, consist in forming the nonmetallic rim portion of a fibrous sheet material in the form of segments, rings or strips, the latter being notched or slit to adapt it to be wound edgewise about the periphery of a hub. Such sheet material is impregnated with a suitable binder, such as a phenolic condensation product, which is hardened under the influence of heat and pressure to consolidate the assembled structure.

My present invention is directed to a method of forming composite gear wheels which comprises employing a strip of fibrous sheet material disposed in superposed layers and forming an endless helix about the periphery of a metal hub. I propose to slit the strip transversely in such a manner as to form contiguous interlocking dove-tail sections which are alternately twisted or turned as the strip is being wound on the hub. The dove-tailed sections when wound about, and molded to, the hub member provide a non-metallic rim portion of uniform density throughout, which has been impossible to attain with the methods heretofore employed. This is of importance where such structure is employed as a gear element inasmuch as the stresses set up would have a detrimental effect on the requisite seating strength or bond between the rim and hub member and a variation in the density of the material would further result in deterioration that would materially weaken the tooth structure.

Figure 1:
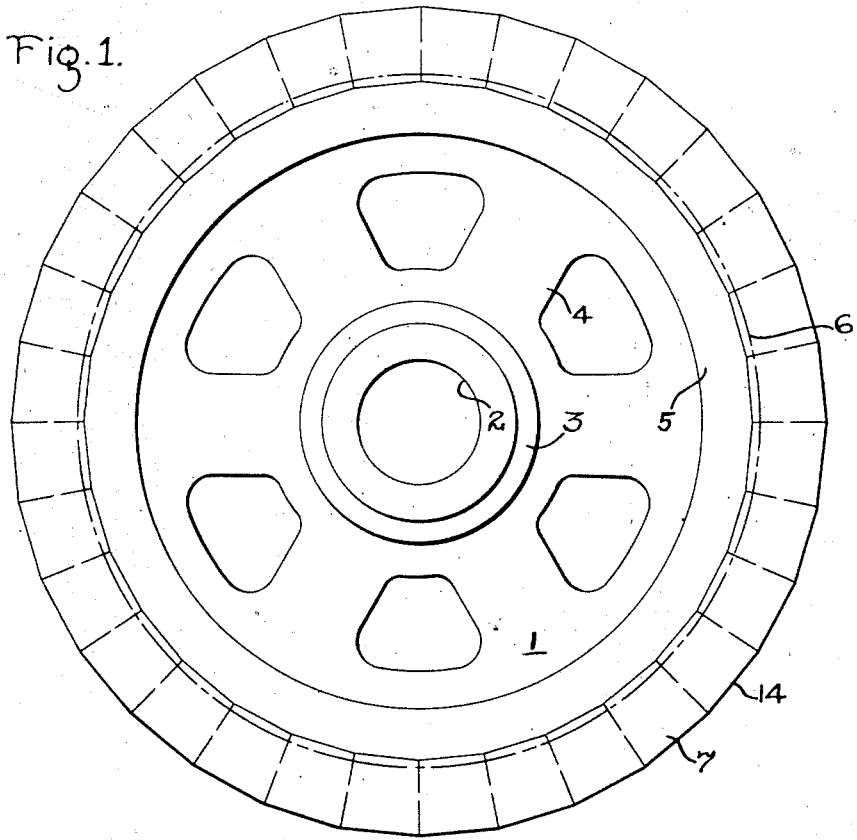

In the accompanying drawing constituting a part hereof and in which like reference characters designate like parts, Figure 1 is a plan view of a composite article embodying the principles of my invention.

Figure 2:
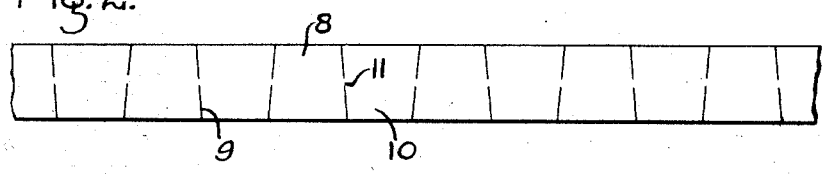
Figure 3:
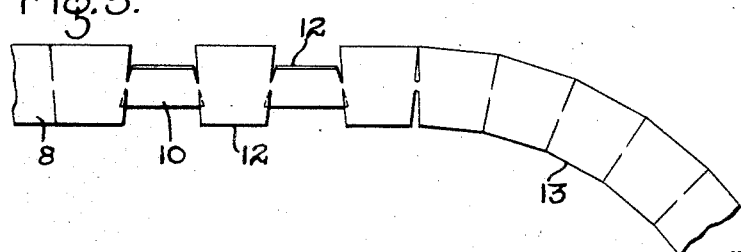

Fig. 2 is a plan view of a strip such as I utilize in forming the non-metallic rim portion of the wheels, Fig. 1, and Fig. 3 is a plan view, partially in perspective, illustrating the disposition of the dove-tailed sections prior to and during the winding of the strip on its supporting hub.

The structure illustrated in Fig. 1 comprises a hub member 1, having a central opening 2 therein by which it is adapted to be seated on a drive shaft and having a projecting hub portion 3, a spoked web portion 4, and an outer rim 5, the latter being provided with a roughened outer periphery 6 produced as by knurling, on which the non-metallic rim portion 7 is formed.

The outer rim 7 comprises a helix of superposed layers of fibrous sheet material consolidated with a hardened binder, such as a phenolic condensation product, which is applied in the form of a strip 8, Figs. 2 and 3. The strip 8 is provided with transverse slits 9 which are interrupted at the center of the strip to form a plurality of contiguous dove-tailed sections 10 which are severally joined by the unslit portions 11 to facilitate winding the material about the periphery of the hub 1.

As shown in Fig. 3, alternate sections 10 are twisted or turned about the uncut portions 11 180° so that their narrow edges 12 are disposed on the same side. This arrangement effects an angular disposition of the sections to produce a curvature 13 in the strip corresponding to the curvature of the hub 1 as illustrated in Fig. 3. The edge 13 of the strip 8 is shortened by disposing the dove-tailed strip section with the narrow portion on one side to compensate for the difference in the circumference of the hub member 1 and the outer face 14 of the rim 7.

The strip 8 may be wound on the hub 1 and the alternate sections of the slit strip may be twisted or turned in any suitable manner, preferably by suitable guides and coacting guide members to facilitate production and to reduce the expense of assembling the material. When a sufficient number of turns of the strip material have been formed about the hub, the assembled structure is disposed in the matrix of a suitable mold which is inserted between a pair of heatable platens, of a hydraulic press and subjected simultaneously to heat and pressure to fuse the binder, compact the material and subsequently harden the binder to form a unitary consolidated rim portion integral with the metal hub.

It will be readily understood from the foregoing description of my invention that composite articles made in accordance therewith provide a structure of uniform density throughout their non-metallic body portions which render the same particularly useful for gear wheel operation and that such articles may be formed without any waste as the manner of slitting does not destroy any of the material.

Although I have described a specific embodiment of my invention, it will be obvious to those skilled in the art that various modifications may be made in the details of construction without departing from the principles herein set forth. For instance, the dove-tailed sections may be applied in the form of individual punchings which may be assembled in the mold to have the same position as the strip member. Any suitable fibrous material such as duck, paper and the like may be utilized for the strip member and any suitable binder may be employed instead of the phenolic condensation product.

I claim as my invention:—

1. A composite article comprising a metal hub and a non-metallic rim integral therewith, said rim comprising a strip of fibrous sheet material helically wound about said hub and consolidated with a hardened binder, the strip being slit and twisted to provide a rim structure of uniform density.

2. A composite article comprising a metal hub and a non-metallic rim integral therewith, said rim comprising a strip of fibrous sheet material provided with transverse slits to constitute substantially interlocking dovetail portions which are alternately twisted relatively to said strip, said strip being helically wound about said hub in superposed layers and consolidated with a hardened binder to form a rim structure of uniform density.

3. A composite article comprising a metal hub and a non-metallic rim integral therewith comprising a helically wound strip of fibrous sheet material having inclined slits and having alternate sections between said slits twisted 180° so that the slits are radial to said hub, said helically wound strip being consolidated with a hardened binder.

4. A composite article comprising a metal hub and a non-metallic rim integral therewith comprising a strip of helically wound fibrous sheet material having inclined slits and having alternate sections between said slits twisted, said non-metallic rim being consolidated with a hardened binder.

5. A composite article comprising a metal hub and a non-metallic rim integral therewith comprising a helically wound strip of fibrous sheet material having inclined slits extending from its outer edges and meeting at substantially the center of the strip, alternate sections between said slits being twisted to effect a radial disposition of all of said slits with respect to said hub.

6. The method of making composite articles which comprises providing a metal hub and a strip of fibrous sheet material impregnated with a binder, forming transverse slits in said strip to provide interlocking dovetail sections, twisting alternate sections 180° to dispose the narrow edge of said dove-tails on one edge of said strip, winding the strip into a helix about said hub and consolidating the assembled strip by the application of heat and pressure to form a unitary structure integral with said hub.

Is testimony whereof, I have hereunto subscribed my name this 17th day of August, 1923.

HARRY C. BIERMAN.